US 6,578,752 B1

(12) United States Patent
Willemen

(10) Patent No.: US 6,578,752 B1
(45) Date of Patent: Jun. 17, 2003

(54) METHOD AND APPARATUS FOR SEPARATING DROSS FLOATING ON SOLDER

(75) Inventor: Lambertus P. C. Willemen, Dorst (NL)

(73) Assignee: Vitronics Soltec B.V., Oosterhout (NL)

( * ) Notice: Subject to any disclaimer, the term of this patent is extended or adjusted under 35 U.S.C. 154(b) by 0 days.

(21) Appl. No.: 09/743,041
(22) PCT Filed: Jul. 9, 1999
(86) PCT No.: PCT/NL99/00439
§ 371 (c)(1),
(2), (4) Date: Apr. 6, 2001
(87) PCT Pub. No.: WO00/02695
PCT Pub. Date: Jan. 20, 2000

(30) Foreign Application Priority Data

Jul. 10, 1998 (NL) .............................. 1009615

(51) Int. Cl.⁷ ................................. B23K 3/06
(52) U.S. Cl. ..................... 228/56.1; 228/34; 228/37; 228/256
(58) Field of Search ................ 228/256, 257, 228/258, 259, 260, 261, 262, 13, 14, 33, 34, 35, 36, 37, 38, 39, 40, 56.1

(56) References Cited

U.S. PATENT DOCUMENTS 4,724,994 A * 2/1988 Flury ..................... 228/56.2
5,044,542 A * 9/1991 Deambrosio ............. 228/37
5,087,356 A * 2/1992 Webb ...................... 210/143
5,419,482 A * 5/1995 Hendrikx .................. 228/37
5,711,473 A * 1/1998 Sund ...................... 228/180.1

FOREIGN PATENT DOCUMENTS

| EP | 0212911 | 3/1987 |
| FR | 2267850 | 11/1975 |
| JP | 6-190548 | * 7/1994 |
| JP | 10-190206 | * 7/1998 |

OTHER PUBLICATIONS

Marshall Space Flight Center, Alabama: "Removing dross from molten solder" NTIS Tech Notes, 1990, pp. 1100 (XP000179988), Springfield, VA, USA.

* cited by examiner

Primary Examiner—M. Alexandra Elve
Assistant Examiner—Len Tran
(74) Attorney, Agent, or Firm—Banner & Witcoff, Ltd.

(57) ABSTRACT

A method for separating dross floating on solder into solder and a residue, comprising of repeatedly cutting through the dross with at least one knife extending substantially parallel to the direction of movement and removing the residue from the solder. The invention also relates to an apparatus for separating dross floating on solder present in a vessel into solder and a residue, wherein the apparatus comprises at least one knife which is movable along a path extending through the vessel, and wherein the at least one knife is adapted to cut through the dross during the movement along the path. Due to the above stated cutting operation the units of the dross formed by nuclei of solder enveloped by metal oxides are destroyed, whereby the solder enveloped by metal oxides are destroyed, whereby the solder is released and added to the solder already present in the bath, and the released metal oxide will float on the solder. A considerable volume and mass reduction of dross to metal oxide herein takes place. The metal oxide is generally in powder form and can then be easily removed.

20 Claims, 2 Drawing Sheets

METHOD AND APPARATUS FOR SEPARATING DROSS FLOATING ON SOLDER

FIELD OF THE INVENTION

Dross occurs when soldering processes are performed. Dross consists of oxides of the metals of which the solder is composed, therefore usually tin oxide and lead oxide. Dross further comprises contaminants which come from the flux used or from other agents applied in the process. Dross has a density which is smaller than that of solder so that dross floats on the solder. Dross herein disrupts the soldering process.

BACKGROUND OF THE INVENTION

It is known in the prior art to remove dross by regularly scooping it out of the solder bath and discharging it.

Research has shown however that dross is not only formed by metal oxides and contaminants of chemical agents but that dross is also formed by non-oxidized solder. During the oxidization process nuclei of solder are formed which are enveloped by oxides. Clusters of such units form the dross.

When the dross is scooped away not only are metal oxides and possible other contaminants therefore removed but also a considerable amount of usable solder. This results in the disposal of a large quantity of metals, of which a considerable part is still usable, which is undesirable from an environmental and economic viewpoint.

BRIEF DESCRIPTION OF THE INVENTION

The object of the present invention is to provide a method and apparatus wherein the dross is separated into metal oxide and solder so that the drawbacks of the prior art are avoided.

This object is achieved by such a method wherein at least one knife extending substantially parallel to its direction of movement repeatedly cuts through the dross and the residue is removed from the solder.

This objective is also achieved by an apparatus comprising at least one knife which is movable along a path extending through a vessel, wherein the at least one knife is adapted to cut through the dross during the movement along the path.

Due to the above stated cutting operation the units of the dross formed by nuclei of solder enveloped by metal oxides are destroyed, whereby the solder is released and added to the solder already present in the bath and the released metal oxide will float on the solder. An important measure herein is that a cutting movement is performed. It is otherwise known to remove floating dross from solder by shifting the dross away with a scraping operation. A movement of a type of knife herein takes place transversely of the length direction thereof. Such a method and apparatus are known from the journal article "Removing dross from molten solder", NTIS TECH NOTES, 1990, p. 1100, Springfield, Va., USA.

In the method according to the invention a considerable volume and mass reduction of dross to metal oxide takes place. The metal oxide is generally in powder form and can then be easily removed.

It is pointed out here that after chemical reduction the metal oxide in question is suitable as pure raw material for the preparation of solder. This is an environmental and economic advantage. A further cleaning step will of course also have to be applied here, subject to the contamination.

According to an attractive embodiment the solder is transported to a separating vessel before the cutting operation takes place and the resulting solder is fed back to the vessel.

According to this embodiment this vessel is a separating vessel and this latter is connected to a processing vessel by supply means for carrying solder provided with dross from the processing vessel to the separating vessel and by discharge means for feeding solder back from the separating vessel to the processing vessel, wherein the supply means debouch at a higher level in the separating vessel than the discharge means.

As a consequence of these measures it is possible to carry out in normal manner the operations to be performed in the processing vessel, such as soldering of objects, while the separating operation can take place independently. The separating vessel can therefore be optimized in terms of dimensioning and the like for the operations to be performed therein.

Other attractive embodiments are stated in the sub-claims.

BRIEF DESCRIPTION OF THE DRAWINGS

The present invention will be elucidated hereinbelow with reference to the annexed drawings, in which.

DETAILED DESCRIPTION OF THE INVENTION

Figure 1:
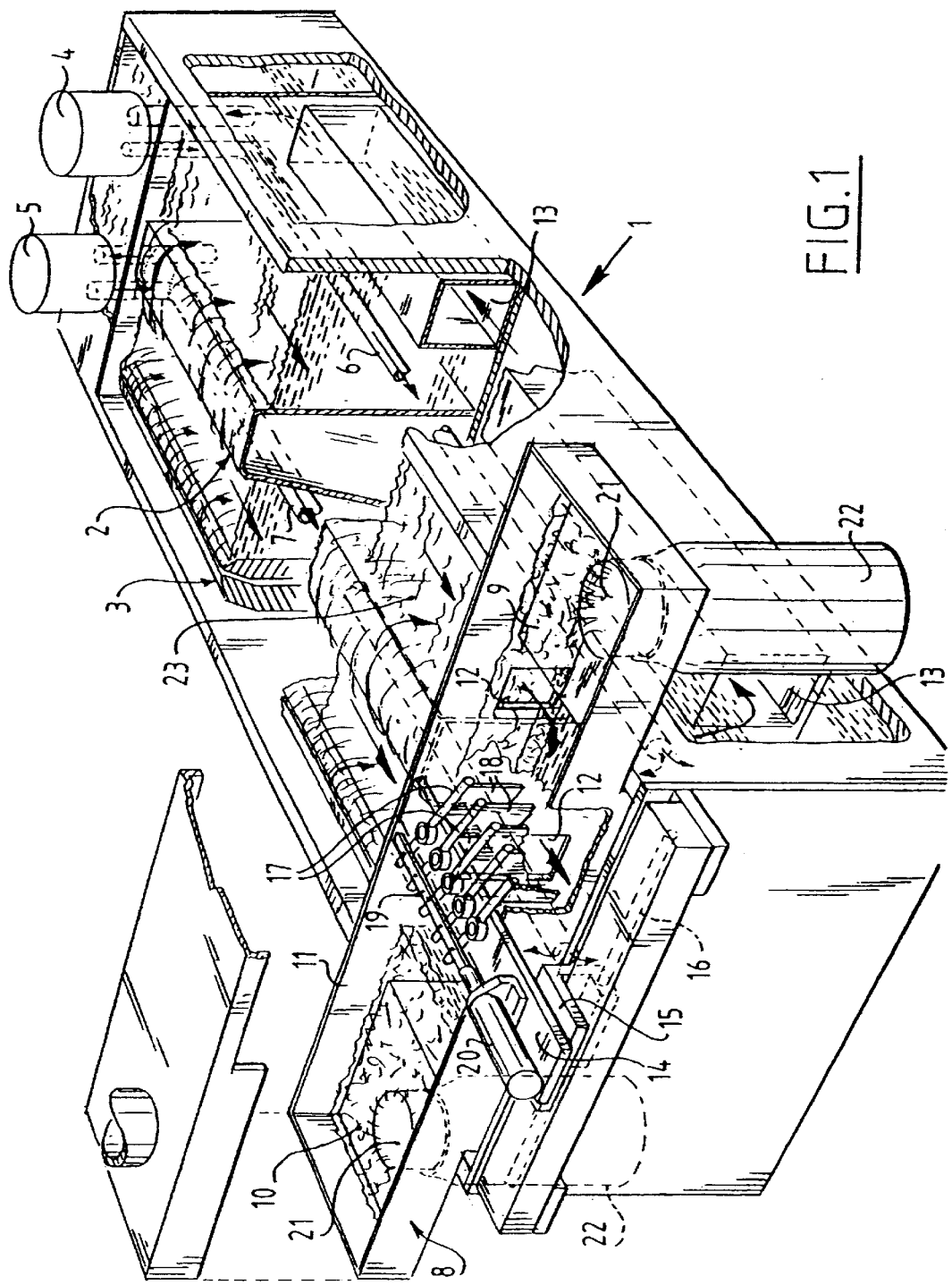
FIG. 1 shows a partly broken-away perspective view of a soldering vessel provided with an apparatus according to the present invention.

The apparatus comprises a soldering vessel 1 in which are arranged two soldering towers 2, 3. Objects for soldering are carried above the vessel so that the waves of solder coming out of soldering towers 2, 3 solder the objects for soldering. Two pumps 4 and 5, which are connected to soldering towers 2 and 3, respectively, by two separate chambers 6 and 7, respectively, are used to generate the solder waves.

The apparatus described up to this point is generally known in the art so that the associated components require no further elucidation.

For the removal of dross, use is made according to the invention of a separating vessel 8 which in the present embodiment is placed partly in and partly on processing vessel 1. It will be apparent that it is possible to arrange the separating vessel in another position. Separating vessel 8 has elevated bottoms 9 and 10 on its sides, while the remaining part of the separating vessel 8 has a recessed bottom. A supply opening 12 is arranged in a side wall 11 of the separating vessel. This supply opening 12 serves to supply to separating vessel 8 the solder 23 which is present in processing vessel 1 and provided with dross which generally floats on the solder. Opening 12 is arranged for this purpose at the position of the liquid level in vessel 1, so that not only the solder but also the dross floating thereon will enter separating vessel 8 through opening 12.

Consequent to the law of communicating vessels the liquid level in separating vessel 8 will be the same as that in processing vessel 1.

For discharge of the cleaned solder out of the separating vessel, an opening 13 is arranged which leads from separating vessel 8 to processing vessel 1. In this embodiment pump 4 draws solder out of soldering vessel 1. The path between opening 13 and the suction opening is used to cause dross possibly remaining behind to rise.

It will be apparent that diverse other configurations could be applied.

In order to carry out the actual separating operation, a support 14 is arranged above separating vessel 8, which support is movable in a lengthwise direction of separating vessel 8. For this purpose the support 14 is mounted on a bracket 15 movable along a rail 16. Use is made for driving hereof of a drive mechanism, not shown in the drawing, for instance a screw spindle drive mechanism, a drive mechanism provided with a toothed belt or a linear drive in the form of a linear electric motor or a hydraulic or pneumatic cylinder.

Arranged on support 14 in the present case are five knife carriers 17, each of which is rotatable relative to support 14. A knife 18 is fixed to each of the knife carriers 17. Each of the knife carriers is connected to an operating pin 19 which is connected in turn to a linear drive element 20 arranged on support 14. By operating linear drive element 20 it is thus possible to cause rotation of knives 18. The dimensioning of knives 18 is such that they move just above the elevated bottoms 9, 10 and there have a scraping action. If desired, a device may be provided to scrape off the knives after a number of cutting operations.

In elevated bottoms 9,10 are arranged openings 21 which lead to filling containers 22 for arranging under the associated bottoms.

The operation of the present invention will now be elucidated.

When the soldering apparatus is set into operation the pumps 4 and 5 will push solder to soldering towers 2,3 which, after the required soldering process, cause the solder to flow back into solder vessel 1, whereafter the solder will enter separating vessel 8 through opening 12. All the solder contaminated with dross will pass through opening 12 into the separating vessel.

At regular time intervals the support 14 will execute a linear movement in lengthwise direction of separating vessel 8 so that knives 18 will follow this movement. The dimensioning of the knives and the vessel is such that during these movements the dross floating on the solder is cut through so that, as already stated in the introduction, the dross is separated into solder and a residue.

This residue, which is substantially powdery and has a low specific weight, will come to float on top of the solder. During the reciprocating movement of carriers 17 the linear drive device 20 is activated at both turning points close to bottom 9 and 10, so that a scraping action is carried out here against the wall and any adhering oxides are detached. After a determined time the powdery residue will reach a determined level and be pushed over the bottom 9 and 10 to opening 21 and collected in a discharge vessel 22. These will therefore have to be emptied regularly.

Figure 2:
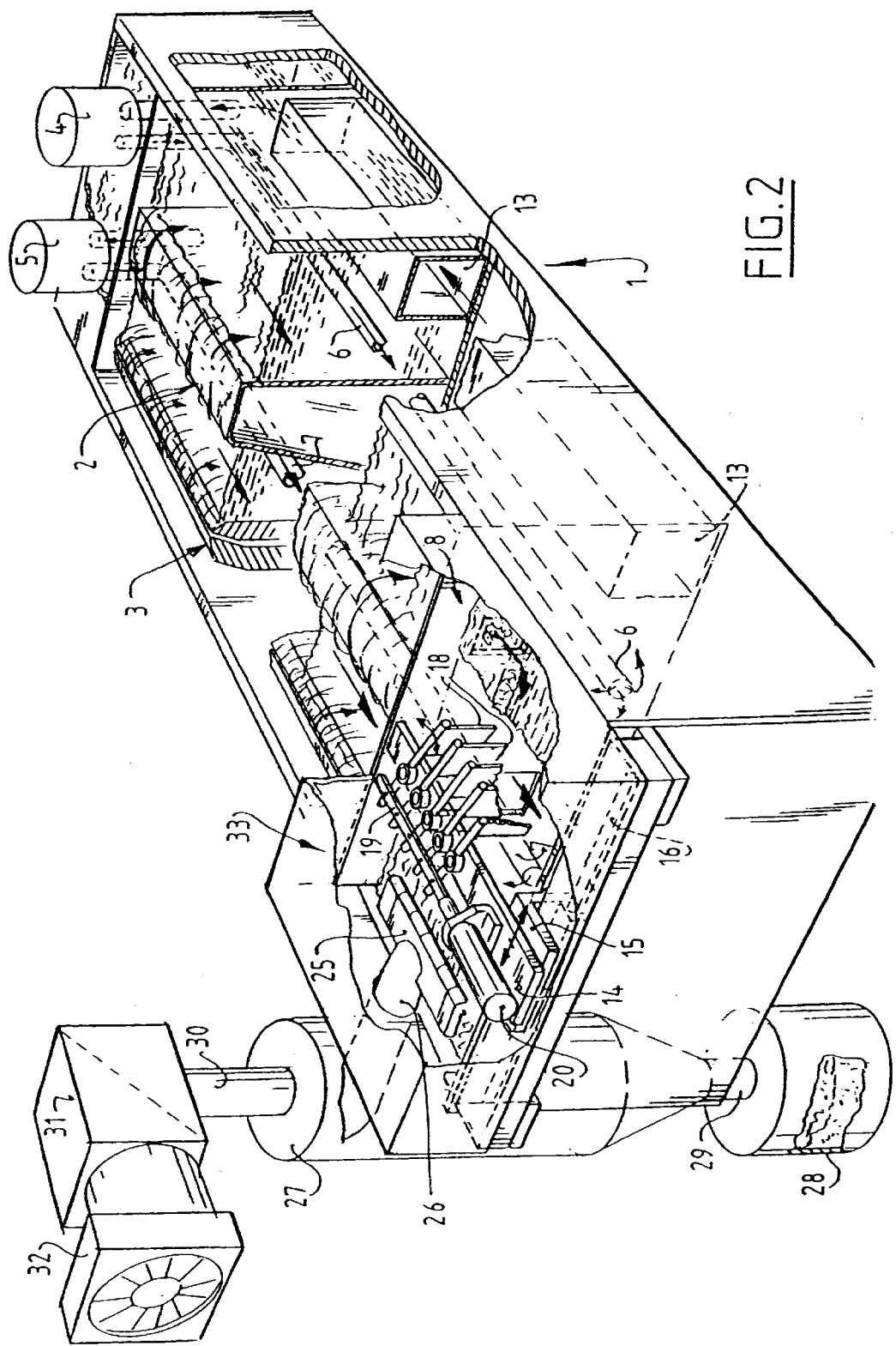
FIG. 2 is a view similar to FIG. 1 showing a second embodiment of the invention.

In the embodiment of the invention shown in FIG. 2 the elevated bottoms 9 and 10 in separating vessel 8 are omitted. The openings 21 arranged therein and discharge vessels 22 are also omitted.

Instead a suction nozzle 25 is arranged in separating vessel 8, which as a result of the absence of elevated bottoms 9,10 takes a smaller form. Suction nozzle 25 is placed slightly above the level of the solder present in the separating vessel. Connected to suction nozzle 25 is a tube 26 which leads to a cyclone 27. On its underside cyclone 27 is connected to a releasably arranged discharge vessel 28, wherein a controllable valve 29 is arranged between the underside of cyclone 27 and discharge vessel 28. A central tube 30 is arranged on the top side of the cyclone for discharge of gases passing through the cyclone, which tube leads via a filter 31 to a fan 32. This latter is driven by an electric motor not shown in the drawing.

In this configuration an air flow is generated by fan 32 which is transmitted from suction nozzle 25 through tube 26 into the cyclone. Suction nozzle 25 herein co-displaces a combination of air and the residue of the dross separated by the cutting device, wherein the residue is separated from the air flow in cyclone 27. The air flow is then transmitted through conduit 30 and filter 31 to fan 32. Via valve 29 the residue separated in cyclone 27 enters collecting vessel 28 where it can be discharged. As an option a cover 33 is herein placed on top of separating vessel 8. The air flow through the cyclone etc. can be better controlled using this cover.

It is also possible for cover 33 to form part of a cover extending over the whole soldering apparatus. This embodiment is particularly important in the case of a soldering apparatus suitable for soldering under a low-oxygen environment. A gas not containing oxygen, for instance nitrogen, is herein supplied to the environment of the soldering apparatus. In such an embodiment the fan 32 therefore also draws off the low-oxygen gas from the separating vessel and carries it to the outside atmosphere. It may be advantageous to feed this low-oxygen gas leaving fan 32 back to a collecting vessel for low-oxygen gas so that it can be reused.

An effective apparatus is thus obtained for cleaning solder, wherein a part of the dross normally scooped off as waste can be usefully employed as solder and another part can be converted into a material which can be converted into solder by simple chemical actions.

What is claimed is:

1. Method for separating dross floating on solder into solder and residue, comprising the steps of:

repeatedly cutting through the dross with at least one knife by moving the knife in a substantially parallel direction to a longitudinal direction of the knife, and removing the residue from the solder.

2. Method as claimed in claim 1, further comprising:

transporting the solder and dross from a soldering vessel to a separating vessel before the cutting operation takes place, and feeding solder with the residue removed therefrom back to the soldering vessel.

3. Method as claimed in claim 1, wherein the residue is removed by suction.

4. Apparatus for separating dross floating on solder present in a vessel into solder and a residue, comprising:

at least one knife which longitudinally extends substantially parallel to a direction of knife movement and which is movable along a path extending through the vessel, wherein the at least one knife is adapted to cut through the dross during the movement along the path.

5. Apparatus as claimed in claim 4, wherein the apparatus includes a plurality of knives mounted on a common support, wherein blades of the knives extend mutually parallel, and wherein the path extends substantially horizontally.

6. Apparatus as claimed in claim 4, wherein the vessel is a separating vessel that is connected to a soldering vessel by supply means for carrying solder including dross from the soldering vessel to the separating vessel and by discharge means for feeding solder with the residue removed back from the separating vessel to the soldering vessel.

7. Apparatus as claimed in claim 4, wherein the vessel is provided with scooping means for scooping off the residue.

8. Apparatus as claimed in claim 7, wherein the scooping means comprise an elevated bottom part and a scraper member for scraping the bottom part.

9. Apparatus as claimed in claim 8, wherein the scraper member comprises at least one of the knives mounted on a support.

10. Apparatus as claimed in claim 9, wherein the elevated bottom part is connected to a discharge vessel for the residue, and wherein the scraper member is adapted to move the residue into the discharge vessel.

11. Apparatus as claimed in claim 5, wherein the knives are each mounted on the common support for simultaneous rotation on a vertical axis.

12. Apparatus as claimed in claim 5, wherein the common support is adapted to execute a linear reciprocal movement, which causes rotation of the knives, at an end of the movement along the path.

13. Apparatus as claimed in claim 12, further comprising:
   a control device to cause the knives to be scraped off after a number of cutting operations.

14. Apparatus as claimed in claim 6, wherein the supply means comprise a supply channel which debouches in the soldering vessel at a position of a liquid level, and wherein the discharge means comprise a discharge channel which debouches in the separating vessel below the liquid level.

15. Apparatus as claimed in claim 4, further comprising:
   a suction means connected to the vessel for drawing the residue out of the vessel.

16. Apparatus as claimed in claim 15, wherein the suction means comprise a cyclone, an underside of which is connected to a collecting vessel.

17. Apparatus as claimed in claim 16, wherein the cyclone is connected to a filter, which is connected to a fan.

18. Apparatus as claimed in claim 15, further comprising:
   a cover placed over the vessel.

19. Apparatus as claimed in claim 10, wherein the knives are each mounted on a common support for simultaneous rotation on a vertical axis.

20. Apparatus as claimed in claim 11, wherein the common support is adapted to execute a linear reciprocal movement, which causes rotation of the knives, at an end of the movement along the path.

* * * * *